United States Patent [19]

Koltookian

[11] Patent Number: 5,085,557

[45] Date of Patent: Feb. 4, 1992

[54] LARGE PART ROLLOVER DEVICE

[75] Inventor: Sarkis A. Koltookian, Cedar Falls, Iowa

[73] Assignee: Deere & Company, Moline, Ill.

[21] Appl. No.: 628,244

[22] Filed: Dec. 17, 1990

[51] Int. Cl.⁵ .......................................... B65G 47/248
[52] U.S. Cl. ................................. 414/778; 269/104; 269/289 MR; 269/310; 414/719; 414/758; 414/766; 414/773; 414/783
[58] Field of Search ............... 269/104, 289 MR, 298, 269/310; 414/719, 765, 766, 771, 773, 778, 783, 784, 758, 761, 763, 764, 777, 779

[56] References Cited

U.S. PATENT DOCUMENTS

| | | |
|---|---|---|
| 520,720 | 5/1894 | Armstrong . |
| 1,404,335 | 1/1922 | Barnes . |
| 2,011,627 | 8/1935 | Graham . |
| 2,643,780 | 6/1953 | Rowe ............................ 414/773 X |
| 2,787,509 | 4/1957 | Hardrath . |
| 2,865,516 | 12/1958 | Hedderich ........................ 414/765 |
| 2,963,248 | 12/1960 | Anderson . |
| 2,984,364 | 5/1961 | Lamb ............................ 414/766 X |
| 3,071,258 | 1/1963 | Seigh et al. . |
| 3,106,301 | 10/1963 | Jeddeloh ........................ 414/758 |
| 3,184,079 | 5/1965 | Buccicone ...................... 414/766 X |
| 3,425,365 | 2/1969 | Thoreson et al. . |
| 3,547,279 | 12/1970 | Radomski . |
| 3,868,101 | 2/1975 | Nozaki et al. ................. 414/766 X |
| 3,895,722 | 7/1975 | Pluntz . |
| 3,998,444 | 12/1976 | Stockwell ...................... 269/310 X |
| 4,056,186 | 11/1977 | Hill . |
| 4,095,700 | 6/1978 | Chiuaru et al. . |
| 4,490,090 | 12/1984 | St. Clair . |
| 4,509,892 | 4/1985 | Redeker et al. . |

FOREIGN PATENT DOCUMENTS 1171313 8/1985 U.S.S.R. ............................ 414/719

Primary Examiner—Robert J. Spar
Assistant Examiner—Janice Krizek

[57] ABSTRACT

A roll-over device includes a roll-over frame which pivots about a horizontal axis and includes a counterweight mounted at the end of a counterweight beam, a support plate and a plurality of roller sections, each with a plurality of standard conveyer rollers. Each roller sections is spring-mounted on the support plate. A pair of part clamping mechanisms are mounted on the support plate. Each part clamping mechanism includes a pair of pneumatic cylinders which are bolted to the support plate. The cylinder rods are attached to opposite ends of a clamp bar. Upon actuation of the clamping mechanism the part to be clamped moves the roller sections towards the support plate until the part engages an abutment member which projects from the support plate so that most of the clamping force is absorbed by the abutment member.

7 Claims, 3 Drawing Sheets

LARGE PART ROLLOVER DEVICE

BACKGROUND OF THE INVENTION

The invention relates to roll-over devices and, in particular, to a roll-over device for use in the manufacturing industry for heavy vehicle parts, as well as for other purposes requiring roll-over operations.

Various mechanisms for turning large parts have been used in the manufacturing industry. There have been air motor powered index tables which hold a part loosely with rather clumsy adapters. Limited function robots have also been used. Also, pivoted hooks with part clamps are used to rotate a part while it hangs from a hoist. A problem with such pivoted hooks is that the hook may have to be unique to a given part configuration. Finally, parts have been hoisted up and then manually tipped over onto a rubber floor mat. It would be desirable to have a part roll-over device which can quickly, safely and simply rotate and positively clamp parts of varying sizes without the need for special adapters.

SUMMARY OF THE INVENTION

An object of the invention is to provide a quick acting roll-over device.

Another object of the invention is to provide a roll-over device having a positive part clamping mechanism.

Still another object of the invention is to provide a roll-over device which can accommodate parts of widely varying sizes and which does not require adapters.

Another object of the invention is to provide a roll-over device which is safe and which does not require hoisting of parts.

Another object of the invention is to provide a roll-over device which is easily integrated into a conveyor line.

These and other objects of the invention are achieved by the present invention wherein a roll-over device includes a floor frame which supports a pair of vertical supports. The vertical supports pivotally support a roll-over frame. The roll-over frame includes a counter-weight mounted at the end of a counterweight beam, a support plate and a plurality of roller sections, each with a plurality of standard conveyer rollers. Each roller section is spring-mounted on the support plate. A pair of part clamping mechanisms are mounted on the support plate. Each part clamping mechanism includes a pair of pneumatic cylinders which are bolted to the support plate. The cylinder rods are attached to opposite ends of a clamp bar. Upon actuation of the clamping mechanism the part to be clamped moves the roller sections towards the support plate until the part engages an abutment member which projects from the support plate so that most of the clamping force is absorbed by the abutment member. A sprocket is non-rotatably attached to a pivot shaft which is non-rotatably attached to the pivot frame. The sprocket and the pivot frame are rotated by a drive chain which has ends coupled to a pair of pivot cylinders.

DETAILED DESCRIPTION

Figure 1:
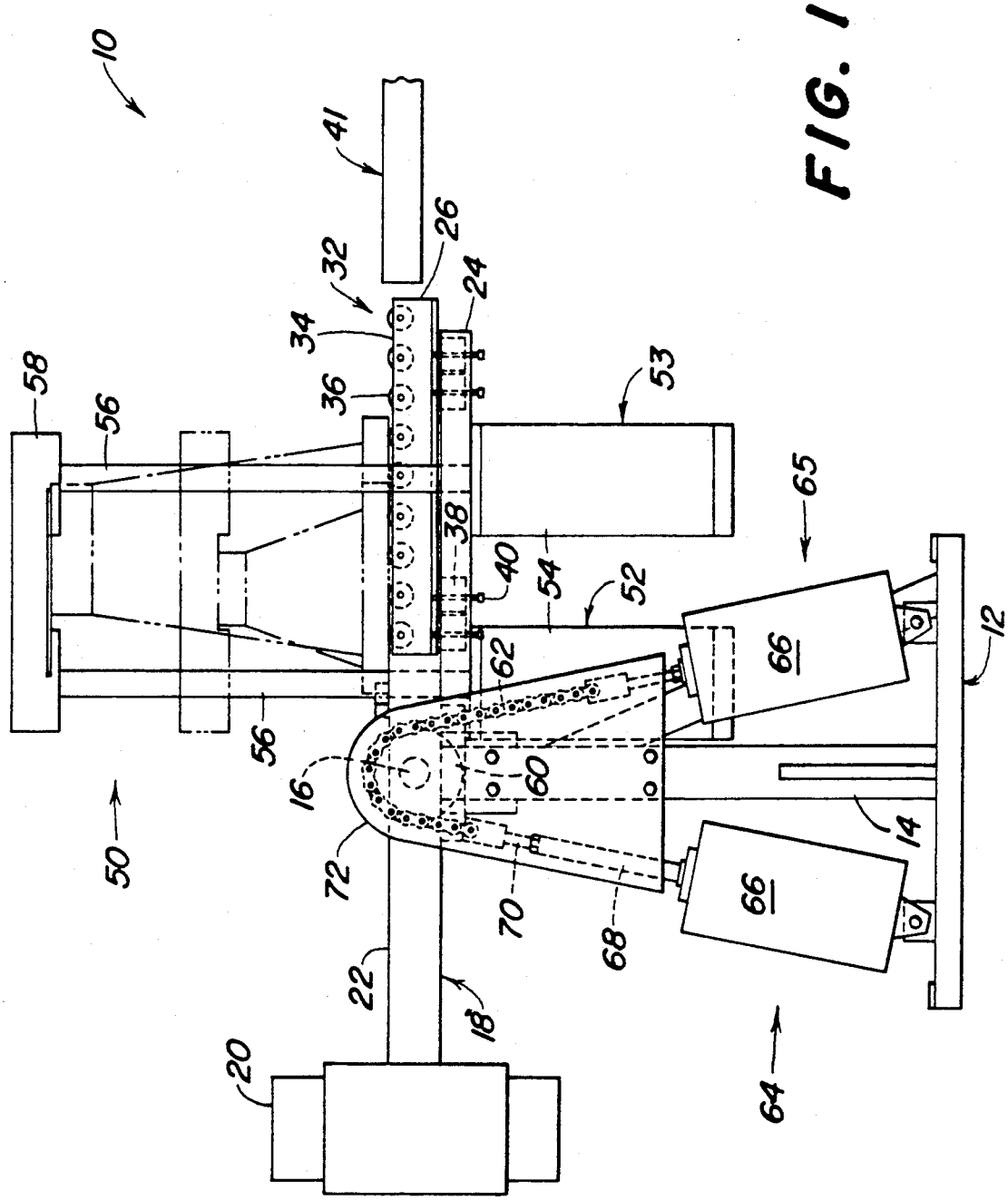
FIG. 1 is a side view of a roll-over device according to the present invention.
Figure 2:
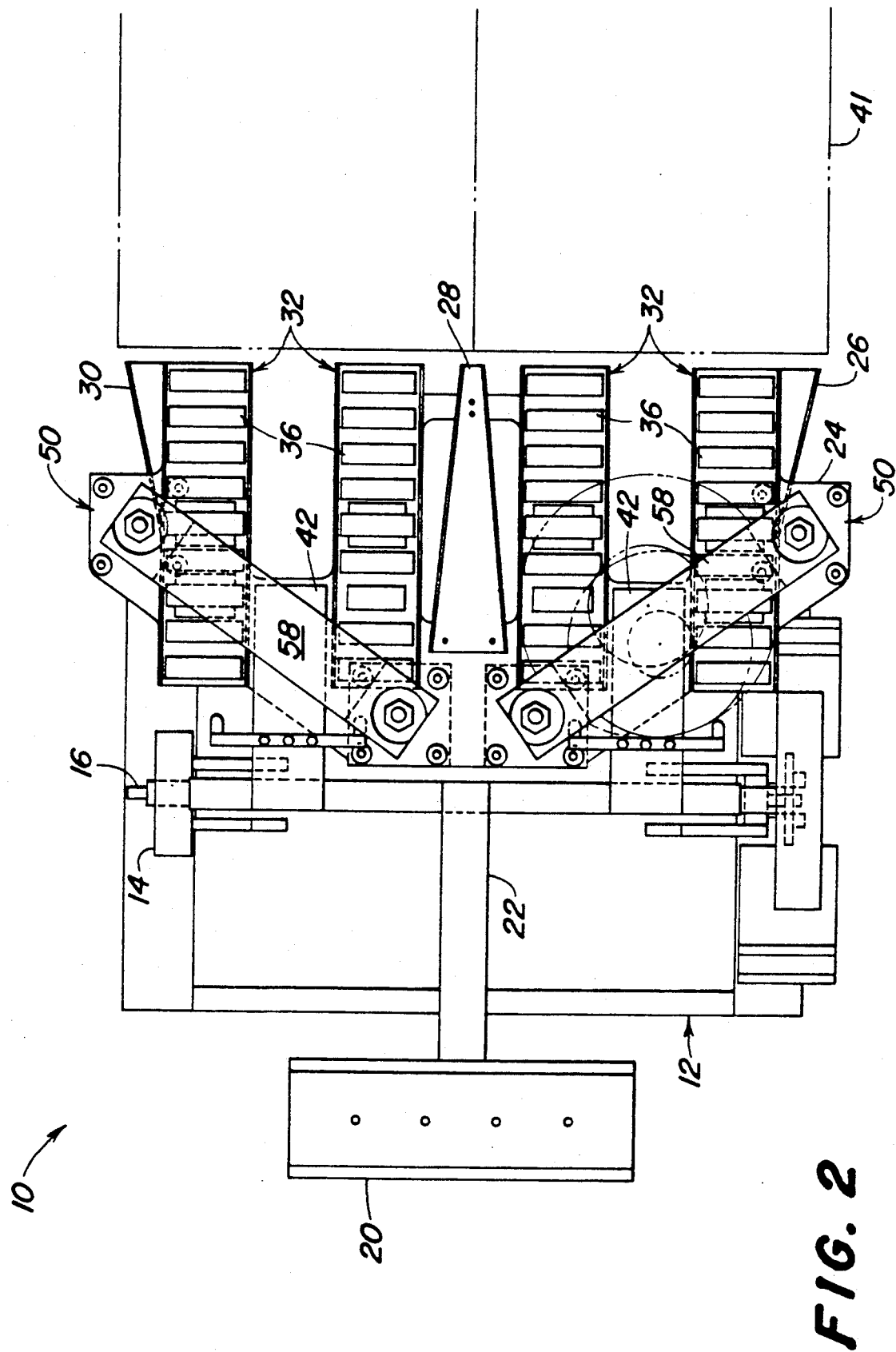
FIG. 2 is a top view of the roll-over device of FIG. 1.

Referring first to FIGS. 1 and 2, the roll-over device 10 includes a floor frame 12 which supports a pair of vertical supports 14. A horizontally extending pivot shaft 16 is pivotally supported by pillow blocks at the top of each vertical support 14. A roll-over frame 18 is rigidly attached to the pivot shaft 16. The roll-over frame 18 includes a counterweight 20 mounted at the end of a counterweight beam 22. The roll-over frame 18 also includes a support plate 24 from which project housing guides 26, 28, and 30. The support plate 24 supports a plurality of roller sections 32, each roller section 32 including a frame 34 which rotatably supports a plurality of standard conveyer rollers 36. Preferably, each roller section 32 is resiliently supported on the support plate 24 by a plurality of springs 38 and is attached to the support plate 24 by a plurality of bolts 40. The bolts 40 are long enough so that the uncompressed springs will hold the roller sections slightly spaced apart from the support plate 24. Having the roller sections 32 spring loaded allows easy, low friction part loading, yet allows solid clamping of heavy parts. A pair of abutment members 42,44 are fixed to the support plate 24 between each pair of the roller sections 32. The abutment members 42,44 have a thickness such that their upper surfaces are below the height of the rollers 36 so that the abutment members 42,44 do not engage parts as they are slid onto the roller sections 32. The roller sections 32 are positioned to receive parts, such as axle housings or other large, heavy parts off of the end of an adjacent conventional conveyor 41.

A pair of part clamping mechanisms 50 are mounted on the support plate 24. Each part clamping mechanism 50 includes a pair of pneumatic cylinders 52,53 with cylinder housings 54 which are bolted to the side of support plate 24 opposite the roller sections 32. Each cylinder 52,53 has a rod 56 which extends through the support plate 24 and the ends of each pair of rods 56 are attached to opposite ends of a clamp bar 58. When one of the part clamping mechanisms 50 is operated the cylinder rods retract and the part is pulled into engagement with one or more of the abutment members 42,44 as the springs 38 compress and allow the roller sections 32 to move towards the support plate 24. In this manner, most of the clamping force is absorbed by the abutment members 42,44 and not by the roller sections 32.

A sprocket 60 is non-rotatably attached to one end of the pivot shaft 16 and a drive chain 62 engages and is partially wrapped around the sprocket 60. A pair of pivot cylinders 64,65 have cylinder housings 66 which are mounted to the floor frame 12. Each pivot cylinder 64,65 has a rod 68 which is attached to one end of the chain 62 by means of an adjustable threaded shaft 70. A cover 72 extends around the drive chain 62 and prevents accidental contact with the chain 62.

Figure 3:
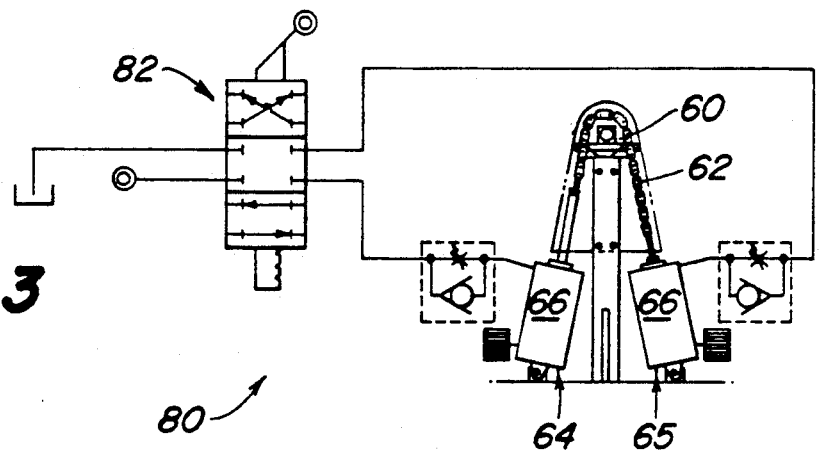
FIG. 3 is a schematic diagram of the hydraulic circuit which controls the pivoting of the roll-over device of FIGS. 1 and 2.

Referring now to FIG. 3, the hydraulic roll-over control circuit 80 includes a manually operated control valve 82 which controls communication between an oil supply and an oil sump and the cylinders 64,65. The control circuit 80 operates to cause the cylinders 64,65 to pivot the roll-over frame 18 at least 180 degrees about the axis of shaft 16.

Figure 4:
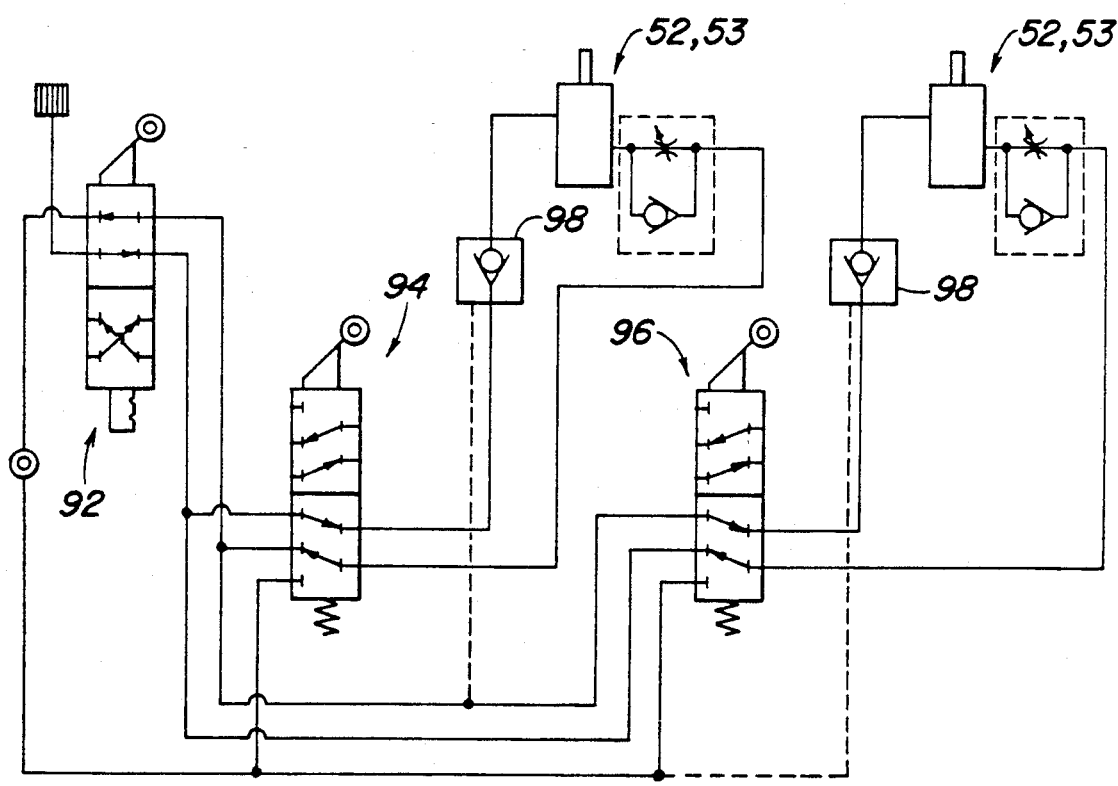
FIG. 4 is a schematic diagram of the hydraulic circuit which controls the clamping mechanisms of the roll-over device of FIGS. 1 and 2.

Referring now to FIG. 4, the pneumatic clamping control circuit 90 includes a manually operated detented control valve 92 which controls communication between an air supply and atmospheric pressure and a pair of manually operated release valves 94,96. In the event of a loss of air pressure or a line break, pilot operated check valves 98 normally prevent pressure from being communicated from the rod ends of the cylinders 52,53 back to the release valves 94,96, and thus prevent a part from accidentally being released from the roll-over device. The release valves 94,96 are spring biased to a normally open position wherein the outlets of control valve 92 are communicated to opposite sides of both pairs of cylinders 52,53 so that, by operating the control valve 92, the cylinders 52,53 can be retracted to clamp the clamping mechanisms 50 or extended to unclamp the clamping mechanisms 50. Each release valve 94,96 is preferably mounted on the roll-over frame 24 near a respective one of the pairs of the clamping mechanisms 50. Thus, each release valve 94,96 is operable to individually and momentarily release one of the clamping mechanisms 50 regardless of the state of the control valve 92.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A roll-over device comprising:
 a support frame;
 a roll-over frame pivotally supported by the support frame, the roll-over frame comprising a support plate, a counterweight mounted at an end of a beam which is attached to the support plate, a low friction conveyer member mounted on the support plate for slidably receiving a part to be rolled over, resilient means for resiliently coupling the conveyer member to the support plate, and an abutment member mounted on the support plate;
 a clamping mechanism mounted on the support plate and operable to releasably hold the part on the roll-over frame, the part moving the conveyer member towards the support plate and the part engaging the abutment member upon actuation of the clamping mechanism; and
 means for pivoting the roll-over frame.

2. The roll-over device of claim 1 wherein the clamping mechanism comprises:
 a pair of fluid operated cylinders with movable rods extending therefrom and a clamping bar engagable with the part to be rolled over and fixed to an end of the rods; and
 a fluid control circuit for controlling operation of the cylinders.

3. The roll-over device of claim 2, wherein:
 the cylinders have cylinder housings which are attached to a side of the support frame opposite from the conveyer member.

4. The roll-over device of claim 2, wherein the fluid control circuit comprises:
 a source of pressurized fluid;
 a fluid reservoir;
 a manually operated control valve for controlling fluid communication between the cylinders, the source and the reservoir to clamp and unclamp the clamping bar;
 a manually operated release valve for controlling fluid communication between the cylinders, the source and the reservoir, the release valve being spring biassed to a clamping position and being manually movable to a release position which causes the cylinders to unclamp the clamping bar; and
 a check valve between the cylinders and the release valve for preventing inadvertent unclamping as a result of a failure of the source of pressurized fluid.

5. The roll-over device of claim 1, wherein the pivoting means comprises:
 a sprocket attached to the roll-over frame for rotation therewith;
 a chain coupled to the sprocket; and
 actuator means coupled to the chain for moving the chain to rotate the sprocket and the roll-over frame.

6. The roll-over device of claim 5, wherein:
 the chain is a two-ended chain; and
 the actuator means comprises a pair of cylinders, each of the pair having a rod coupled to one end of the chain.

7. The roll-over device of claim 1, further comprising:
 guide means mounted on the support frame for guiding parts onto the conveyer member.

* * * * *